US005802468A

United States Patent [19]
Gallant et al.

[11] Patent Number: 5,802,468
[45] Date of Patent: Sep. 1, 1998

[54] SYSTEM AND METHOD FOR IDENTIFYING CALLING AREAS WITHIN A COMMUNICATION SYSTEM

[75] Inventors: John K. Gallant; Kevin Reynolds, both of Plano, Tex.; Stephen Mockford, West Wickam, England; Thomas Wrappe, Plano, Tex.

[73] Assignee: MCI Corporation, Washington, D.C.

[21] Appl. No.: 495,878

[22] Filed: Jun. 28, 1995

[51] Int. Cl.⁶ .................................................. H04Q 7/00
[52] U.S. Cl. .......................... 455/422; 455/440; 455/443; 455/457; 455/517; 455/566; 455/575
[58] Field of Search ........................... 455/33.1, 33.4, 455/54.1, 54.2, 56.1, 33.2, 89, 422, 432, 435, 456, 457, 517, 554–555, 561, 575, 550, 406–408, 524, 440, 514, 436, 443, 446, 450, 455, 566, 462, 465, 121, 113–115, 117, 100–101, 103–105

[56] References Cited

U.S. PATENT DOCUMENTS

| | | |
|---|---|---|
| 4,233,743 | 11/1980 | Frost . |
| 4,843,385 | 6/1989 | Borras . |
| 4,989,230 | 1/1991 | Gillig et al. . |
| 5,105,197 | 4/1992 | Clagett . |
| 5,121,126 | 6/1992 | Clagett . |
| 5,127,042 | 6/1992 | Gillig et al. . |
| 5,168,271 | 12/1992 | Hoff . |
| 5,255,307 | 10/1993 | Mizikovsky . |
| 5,260,987 | 11/1993 | Mauger . |
| 5,260,988 | 11/1993 | Schellinger et al. . |
| 5,276,905 | 1/1994 | Hurst et al. . |
| 5,303,297 | 4/1994 | Hillis . |
| 5,345,498 | 9/1994 | Mauger . |
| 5,444,765 | 8/1995 | Marui et al. ............................ 379/59 |
| 5,568,153 | 10/1996 | Beliveau ............................ 455/33.2 |

Primary Examiner—Reinhard J. Eisenzopf
Assistant Examiner—Doris To

[57] ABSTRACT

A system and method for providing different levels of mobile communication service for a mobile station within a communication system service area. A plurality of base transceiver stations (BTSs) are coupled to a common database. Each BTS has a cellular service area for communicating with the mobile station, a unique identification, and is located with respect to other base transceiver stations for defining a plurality of overlapping cellular service areas which collectively define the service area of the communication system. The common database has a memory for storing data related to a home geographical location associated with the mobile station, and the identity of the BTSs having service areas overlapping the home geographical location. The geometric shapes of the service areas overlapping the home geographical location of the mobile station define a home calling area. A first level of service is provided to the mobile station when the mobile station is inside the home calling area, and a second level of service when the mobile station is outside of the home calling area. The second level of service may be defined by the identities of additional BTSs for providing a third level of service beyond the service areas of these additional BTSs.

41 Claims, 4 Drawing Sheets

SYSTEM AND METHOD FOR IDENTIFYING CALLING AREAS WITHIN A COMMUNICATION SYSTEM

BACKGROUND OF THE INVENTION

1. Field of the Invention

The present invention relates to a mobile communication system. More particularly, the present invention relates to a system and method for identifying calling areas within a mobile communication system.

2. Description of the Related Art

Presently in mobile communication systems, tariffs charged to subscribers for system air-time use is based on defined geographic regions known as calling areas. Typically, as a mobile station (MS) moves from one calling area to another, the tariff charged to a subscriber for use varies accordingly. For example, when service is provided to the mobile station is located within a first calling area, the tariff charged for system air-time use is a first defined rate. When the mobile station moves from the first calling area to a second calling area while service is being provided, the tariff charged is a second, perhaps higher defined rate. The calling areas used are geographic regions that are fairly large, but the trend is for mobile communication systems to offer smaller calling areas, such as major suburbs of a city, as opposed to the entire city and the surrounding area. When personal communication networks (PCNs) are considered, the size of the cells are smaller, consequently, calling areas for PCNs will also be accordingly smaller.

In view of the trend for smaller calling areas, service providers have a need for defining and identifying calling areas for providing varying levels of service with correspondingly varying tariffs for system use. Further, there is a need for determining the location of a mobile station within a mobile service area for reliably providing varying levels of service and correspondingly varying tariffs for system use.

U.S. Pat. No. 5,276,905 to Hurst et al. discloses a mobile radio transmission system which defines a home service area for a mobile station for optimizing usage of radio channels of the system. The disclosed mobile radio transmission system includes a system controller coupled to a plurality of base transceiver station (BTS) facilities geographically arranged for creating a plurality of overlapping service areas. According to Hurst et al., a majority of calls to and from a mobile station are anticipated to originate from within one of the service areas of the plurality of service areas. This service area is defined as the home service area for the mobile station and is used for registering the mobile station within the system. A mobile station is programmed with details of the home service area, that is, the identity of the particular BTS of the home service area, for example. The mobile station will attempt to register and remain registered with the BTS of its home service area for relieving the burden of communication traffic within the system notifying a different BTS that the mobile station has entered the service area associated with that BTS. When the mobile station is sufficiently far from its home service area BTS that the quality of service deteriorates, the mobile station becomes registered with a more local BTS.

By forcing a mobile station to register with a home service area BTS whenever possible system costs are reduced because the burden placed on the system controller is reduced. The tariff charged to a mobile subscriber can be reduced accordingly as long as the mobile subscriber remains within the home service area in the Hurst et al system. Typically, a plurality of mobile stations are associated with one particular home service area. However, if a particular mobile station is predominately located toward an edge of its home service area, it may frequently be required to register with a BTS adjacent to its home service area. System costs would rise accordingly and so would the tariff charged to the mobile subscriber if a higher tariff is associated with service provided in an adjacent service area.

Additionally, atmospheric, geographic and architectural conditions may adversely affect propagation of the radio signals of linking a mobile station to a home service area BTS thus changing the overall shape of the home service area and reducing its effective area. In a situation of a reduced home service area, a mobile station may be required to register with an adjacent BTS and possibly incurring a higher use tariff for the subscriber.

Consequently, what is needed is a system and method for defining a home service area for a mobile station that has a shape which is easily understood by a mobile subscriber, does not adversely change the size under varying environmental conditions, conveniently provides varying levels of service and makes levying of variable tariffs easy.

SUMMARY OF THE INVENTION

The present invention provides a system and a method for defining a plurality of calling area for a mobile station that have shapes which are easily understood by a mobile subscriber, do not adversely change their respective sizes under varying environmental conditions, conveniently provides varying levels of service and makes levying of variable tariffs easy. To achieve these benefits and advantages, the present invention provides a communication system that includes a plurality of base transceiver stations with each base transceiver station having a unique identification, a cellular service area for communicating with the mobile station, and being located with respect to other base transceiver stations for defining a plurality of overlapping cellular service areas, and with the plurality of cellular service areas defining the service area of the communication system, and a common database coupled to each base transceiver station with the common database having a memory storing data related to the mobile station, the data related to the mobile station includes data related to a home geographical location located inside the communication system service area associated with the mobile station, a geographical region surrounding the home geographical location of the mobile station, a home calling area for the mobile station defined by the identification of each base transceiver station having a cellular service area overlapped by the geographical region surrounding the home geographical location of the mobile station, and a physical location of the mobile station with respect to the home calling area, the common database providing a first level of mobile communication service to the mobile station when the physical location of the mobile station is inside the home calling area, and providing a second level of mobile communication service to the mobile station when the physical location of the mobile station is outside of the home calling area. Preferably, the home calling area of the mobile station is a predetermined geometric shape having an average radius of less than 2000 feet.

In one embodiment of the present invention, the mobile station includes a transceiver, a processor coupled to the transceiver, and a memory coupled to the processor. The plurality of base transceiver stations transmit synchronized signals, and the processor of the mobile station monitors the synchronized signals transmitted by the plurality of base transceiver stations, detects a time of arrival of the signals transmitted by respective base transceiver stations monitored by the mobile station, and determines the physical location of the mobile station with respect to the home calling area. The transceiver of the mobile station transmits the determined physical location to a base transceiver station for storage in the memory of the common database. Preferably, the processor of the mobile station calculates a radial separation distance from the mobile station to each of the respective base transceiver stations having signals monitored by the mobile station, and determines the physical location of the mobile station with respect to the home calling area based on the respective calculated radial separation distances.

In another embodiment of the present invention, the data stored in the memory of the common database includes data related to grid coordinate data of a geographical location for each respective base transceiver station, and each base transceiver station transmits grid coordinate data of the geographical location of the respective base transceiver station transmitting the grid coordinate data. In this embodiment, the mobile station includes a transceiver, a processor coupled to the transceiver, and a memory coupled to the processor. The memory of the mobile station stores grid coordinate data of the home geographical location for the mobile station and the grid coordinate data for each base transceiver station. The transceiver receives the transmitted grid coordinate data from a base transceiver station, and the processor determines the physical location of the mobile station based on the received grid coordinate data of the base transceiver station and the grid coordinate data stored in the memory of the mobile station. The transceiver transmits the determined physical location to a base transceiver station for storage in the memory of the common database.

In yet another embodiment of the present invention, the mobile station includes a transceiver that receives the identification of a base transceiver station from the base transceiver station of the cellular service area in which the mobile station is physically located, a processor coupled to the transceiver, a memory coupled to the processor that stores the identification of each base transceiver station having a cellular service area defining the home calling area for the mobile station, and a display coupled to the processor. The processor compares the received identification of the base transceiver station of the cellular service area in which the mobile station is located to the identification of each cellular service area defining the home calling area stored in the memory of the mobile station and actuates the display indicating when the mobile station is physically located within one of the cellular service areas defining the home calling area. Preferably, the display is a liquid crystal display that displays an icon indicating the home calling area when the mobile station is physically located within the one of the cellular service areas defining the home calling area.

The data relating to the mobile station stored in the memory of the common database can also include data related to cellular service areas of additional base transceiver stations associated with the home geographical location of the mobile station, the cellular service areas of the additional base transceiver stations defining a geographical region surrounding the home geographical location of the mobile station, and a local calling area for the mobile station defined by the identification of the additional base transceiver stations having the cellular service areas defining the geographical region surrounding the home geographical location of the mobile station. The common database provides a second level of mobile communication service when the physical location of the mobile station is outside the home calling area and inside the local calling area, and provides a third level of mobile communication service when the physical location mobile station is outside of the local calling area. Preferably, one or more of the cellular service areas of the additional base transceiver stations overlap the home calling area and at least a portion of the cellular service areas of the additional base transceiver stations is within a predetermined geographic boundary. A local calling area icon is displayed at the same place of the display where the home calling area icon when the mobile station is within the local calling area.

The communication system also includes a billing computer coupled to the memory of the common database for calculating a first cost of service for the mobile station when the first level of mobile service is provided to the mobile station, for calculating a second cost of service for the mobile station when the second level of mobile service is provided to the mobile station, and for calculating a third cost of service for the mobile station when the third level of mobile service is provided to mobile station.

The present invention also provides a method for providing different levels of mobile communication service for a mobile station within a communication system service area. The method includes the steps of associating a home geographical location with the mobile station with the home geographical location being located inside the service area of the communication system, determining the identification of each base transceiver station having a cellular service area overlapping the home geographical location, defining a home calling area for the mobile station to be the cellular service areas determined to overlap the home geographical location, storing the identification of each base transceiver station having a cellular service area defining the home calling area in the memory of the common database, determining a physical location of the mobile station with respect to the home calling area, providing a first level of mobile communication service to the mobile station when the mobile station is determined to be inside the home calling area, and providing a second level of mobile communication service to the mobile station when the mobile station is determined to be outside of the home calling area.

According to one embodiment of the method, the step of determining the physical location of the mobile station with respect to the home calling area includes synchronizing signals transmitted by a plurality of base transceiver stations. The signals transmitted by the plurality of base transceiver stations are monitored at the mobile station. A time of arrival of the signals transmitted by respective base transceiver stations monitored by the mobile station is detected. A radial separation distance from the mobile station to each of the respective base transceiver stations having signals monitored is calculated. The physical location of the mobile station with respect to the home calling area is determined based on the respective calculated radial separation distances. The determined physical location of the mobile station is transmitted to a base transceiver station, and the determined physical location is transmitted from the base transceiver station receiving the determined physical location to the common database.

According to another embodiment of the method, the step of determining the physical location of the mobile station with respect to the home calling area includes storing grid coordinate data of the home geographical location of the mobile station in a memory of the mobile station. The grid coordinate data for each base transceiver station is stored in the memory of the mobile station. The grid coordinate data for each base transceiver station includes information of a geographical location of the base transceiver station associated with the data. Grid coordinate data is transmitted from each base transceiver station along with information of the geographical location of the base transceiver station transmitting the grid coordinate data. The transmitted grid coordinate data is then received at the mobile station. The physical location of the mobile station is determined based on the received grid coordinate data of the base transceiver station and the grid coordinate data stored in the memory of the mobile station. The determined physical location of the mobile station is transmitted to a base transceiver station, and the determined physical location is transmitted from the base transceiver station receiving the determined physical location to the common database.

Preferably, the method of the invention includes the steps of storing the identification of each cellular service area defining the home calling area for the mobile station at the mobile station, sending the identification of a cellular service area to the mobile station in which the mobile station is physically located, comparing the identification of the cellular service area in which the mobile station is located to the identifications of the cellular service areas defining the home calling area, and actuating the display to display an icon for indicating when the mobile station is located within one of the cellular service areas defining the home calling area.

To define an additional calling area, such as a local calling area, the method of the invention further includes the steps of associating the cellular service areas of additional base transceiver stations with the geographical location of the mobile station with the geometric shapes of the additional cellular service areas defining a geographical region beyond the home calling area, determining the identification of each of the additional base transceiver stations, defining a local calling area for the mobile station to be the additional cellular service areas, storing the identification of each additional cellular service area defining the local calling area at the common database, providing a second level of mobile communication service when the mobile station is determined to be outside the home calling area and inside the local calling area, and providing a third level of mobile communication service when the mobile station is determined to be outside of the local calling area. Preferably, one or more of the additional cellular service areas overlaps the home calling area and at least a portion of each of the additional cellular service areas is within a predetermined geographic boundary.

To provide the appropriate tariff for service provided to a subscriber, the method of the present invention includes the steps of calculating a first cost of service at a billing computer when the first level of mobile service is provided to the mobile station, calculating a second cost of service at the billing computer when the second level of mobile service is provided to the mobile station, and calculating a third cost of service at the billing computer when the third level of mobile service is provided to the mobile station.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENTS

The present invention is directed to a system and method for defining calling areas for a mobile station within a plurality of service area cells for providing varying levels of service. By defining various calling areas available for subscribers, the communication system can be easily configured for providing varying levels of service and tariff rates. As a consequence, a subscriber can expect defined levels of service for particular calling areas and corresponding tariffs based on the defined calling areas.

Figure 1:
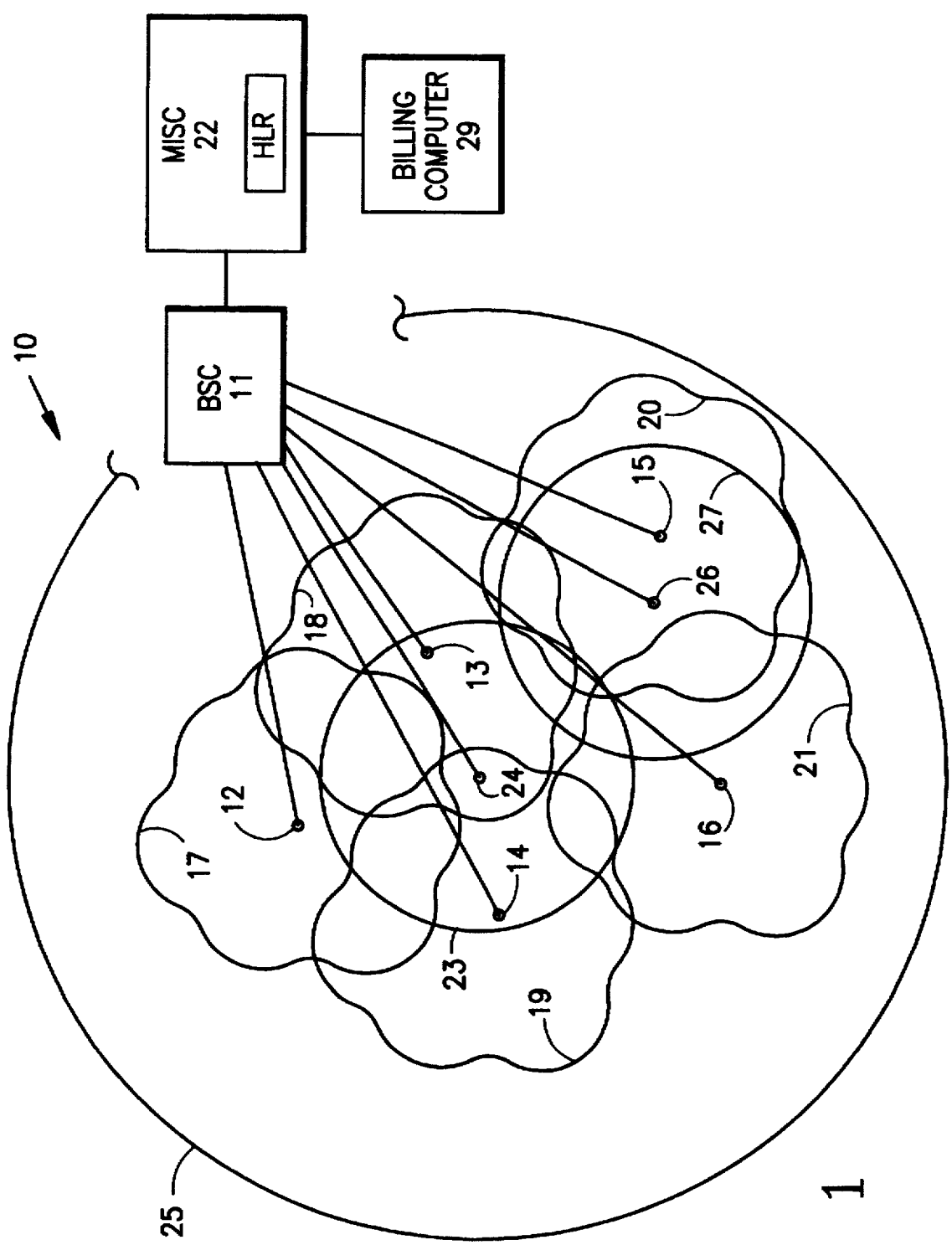
FIG. 1 shows a home and a local service area according to the present invention arranged among a plurality of cellular service areas.

FIG. 1 shows a portion of a service area 10 for a mobile communication system. While the system shown in FIG. 1 is a cellular telephone network, system 10 could also be a personal communication network. The system includes a base station controller 11 coupled to a plurality of base transceiver stations (BTSs) 12–16. Each BTS 12–16 is geographically situated within service area 10 for providing a plurality of overlapping service area cells 17–21, respectively. The system may include other BTSs (not shown) for providing service area cells for a portion of service area 10 that is not shown. Base station controller 11 is connected in a well-known manner to a mobile service switching center (MSC) 22 for connection to a public switched telephone network (not shown) in a well-known manner. A billing computer 29 can be connected to MSC 22 for keeping track of tariffs charged to subscribers for service provided. Billing computer 29 can be located elsewhere in the mobile communication system or in the public switched telephone network.

Service area cells 17–21 are each shown having irregular shapes that are the result of geographical, atmospheric and architectural conditions. For example, hills may cause a service area cell to be shaped roughly to correspond to the topography of the area served by the cell. Weather conditions and air pollution can adversely affect the effective size and shape of a cell. Architectural structures can cause shadowing and reflections that also adversely affect the effective size and shape of a cell. Consequently, the BTSs of the system shown in FIG. 1 are geographically located for worst case conditions so that service area 10 will be fully covered at all times by the respective overlapping service area cells so no gaps occur in the service coverage.

When a subscriber purchases mobile telephone service from a mobile communication system, such as that shown in the example of FIG. 1, the subscriber is usually incognizant of and likely to be unconcerned with the physical layout of the various service area cells forming the service area and how topography, atmospheric and architectural conditions adversely affect the their effective shape and overall service quality. Consequently, the subscriber expects that a defined calling area on which service has been purchased will be invariant in size and shape and that the tariff rate for service within the calling area will be as equally predictable.

To avoid the situation where a calling area physically changes size because of changing environmental conditions, the present invention provides a system and method for defining calling areas within a mobile communication system for providing different levels of communication service for a mobile station and for identifying the location of the mobile station within the communication system. First, the service area of the system is defined in a region by a plurality of BTSs geographically situated for providing overlapping service area cells, like cells 17–21 shown in FIG. 1, so that no gaps in service coverage occur under worst case environmental conditions. Each BTS is assigned a unique identification code that is used for identifying both the BTS assigned the identification code and the service area cell associated with the BTS. For example, the identification code for BTS 12 in FIG. 1 identifies both BTS 12 and service area cell 17. According to one embodiment of the invention, the identification codes of the BTSs are used for determining whether a mobile station is located within a defined calling area, such as a home calling area or a local calling area for example.

A home calling area, according to the present invention, is a geographical region that can be described in units of distance around a subscriber's home geographical location. A home calling area can be a circularly-shaped area defined by an average radius measured in miles, fractions of miles, or feet from a subscriber's registered home address. For example, a home calling area can be a circularly-shaped area having an average radius of less than 2000 feet measured from a subscribers home. A local calling area, according to the present invention, covers an area larger than a home calling area. Typically, a local calling area could be a predetermined geographic area having city or county lines as boundaries.

If a subscriber purchases service based on a home calling area, the subscriber expects a first tariff rate for mobile service provided within the home calling area. Outside the home calling area, but within the local calling area, the subscriber expects a second tariff rate.

To define a home calling area according to a first embodiment of the present invention, the identification code stored in the subscriber identification module (SIM) of the subscriber's mobile station is associated with a home geographical location, such as a street address located within the system service area. That is, the identification code of the mobile station is associated with the physical location of the subscriber's address within the communication system service area and the association is stored in the home location register (HLR) at a common database, such as at MSC 22, for example. The home calling area is superimposed on a geographic representation of the communication system service area centered at the geographical location (address) associated with the mobile station for creating a geographically-based mapping scheme. Typically, the home calling area will be a regularly shaped geometric area such as a circularly-shaped area with a defined average radius centered at the home geographical location of the subscriber. Other regularly shaped geometric areas, such as hexagonally-shaped and octagonally-shaped areas or even squares, rectangles and triangles of comparable size can also be used in place of a circularly-shaped home calling area.

The home calling area defined for a particular subscriber will overlap several of the service area cells of the BTSs. The unique identification codes of the particular service area cells that are overlapped by the home calling area are associated with the stored home geographical location (address) of the subscriber's mobile station and stored in the memory of the common database. The local calling area defined for the subscriber will be larger than the home calling area and overlap a second set of service area cells. The identification codes of the service area cells defining the local calling area are also associated with the stored home geographical location of the subscriber's mobile station and stored in the HLR for the mobile station at the common database.

A local calling area is defined by superimposing a regular geometric shape area, such as a circularly-shaped area, on the geographic representation of the communication system service area. The center of the local calling area can be placed at the home geographical location associated with the mobile station. Typically, a local calling area is larger than a home calling area. For example, a local calling area can include 5 BTSs and their corresponding service area cells. The local calling area can also be a predetermined geographic area having city or country lines as boundaries. The identification codes of the service area cells overlapped by the local calling area are associated with the identification of the mobile station and stored in the mobile station's HLR.

FIG. 1 shows an example of a circularly-shaped home calling area 23 for a first subscriber having a home geographical location 24. Home calling area 23 overlaps service area cells 17, 18, and 19. Service area cells 17–19 are associated with the identification code of the first subscriber's mobile station and stored in the memory of MSC 22. While the total area covered by irregularly-shaped service area cells 17–19 is physically larger than the circularly-shaped home calling area, the subscriber will be guaranteed that the purchased level of service associated with the home calling area will be provided over the home calling area defined for that particular subscriber. The identification codes of the service area cells overlapped by local calling area 25 of the first subscriber will be associated with physical address 24 and stored in the HLR. FIG. 1 also shows a local calling area 25 for the first subscriber that includes service area cells 17–21 in addition to other service area cells which are not shown in FIG. 1.

Whenever the first subscriber uses mobile service in any of service area cells 17, 18 and 19, the mobile station is defined to be within the home calling area and the first subscriber is charged the appropriate tariff rate by billing computer 29 for the mobile service. When the mobile station moves outside the cells defining the home calling area, the common database detects and logs the event so that any mobile service provided outside the home calling area can be charged by billing computer 29 accordingly. Similarly, as the mobile station moves outside of the service area cells defining the local calling area, the common database detects and logs the event so the appropriate service can be provided.

FIG. 1 shows a further example of a second subscriber having a home geographical location 26. The home calling area 27 for the second subscriber will include service area cells 19, 20 and 21. The identification codes of these service area cells will be associated with the identification code of the second subscriber's mobile station and stored in the HLR of the second subscriber. In this example, home calling area 27 overlaps home calling area 23 because of the proximity of respective addresses of the first and second subscribers to show there can be a plurality of overlapping home calling areas within a service area of a system.

Figure 2:
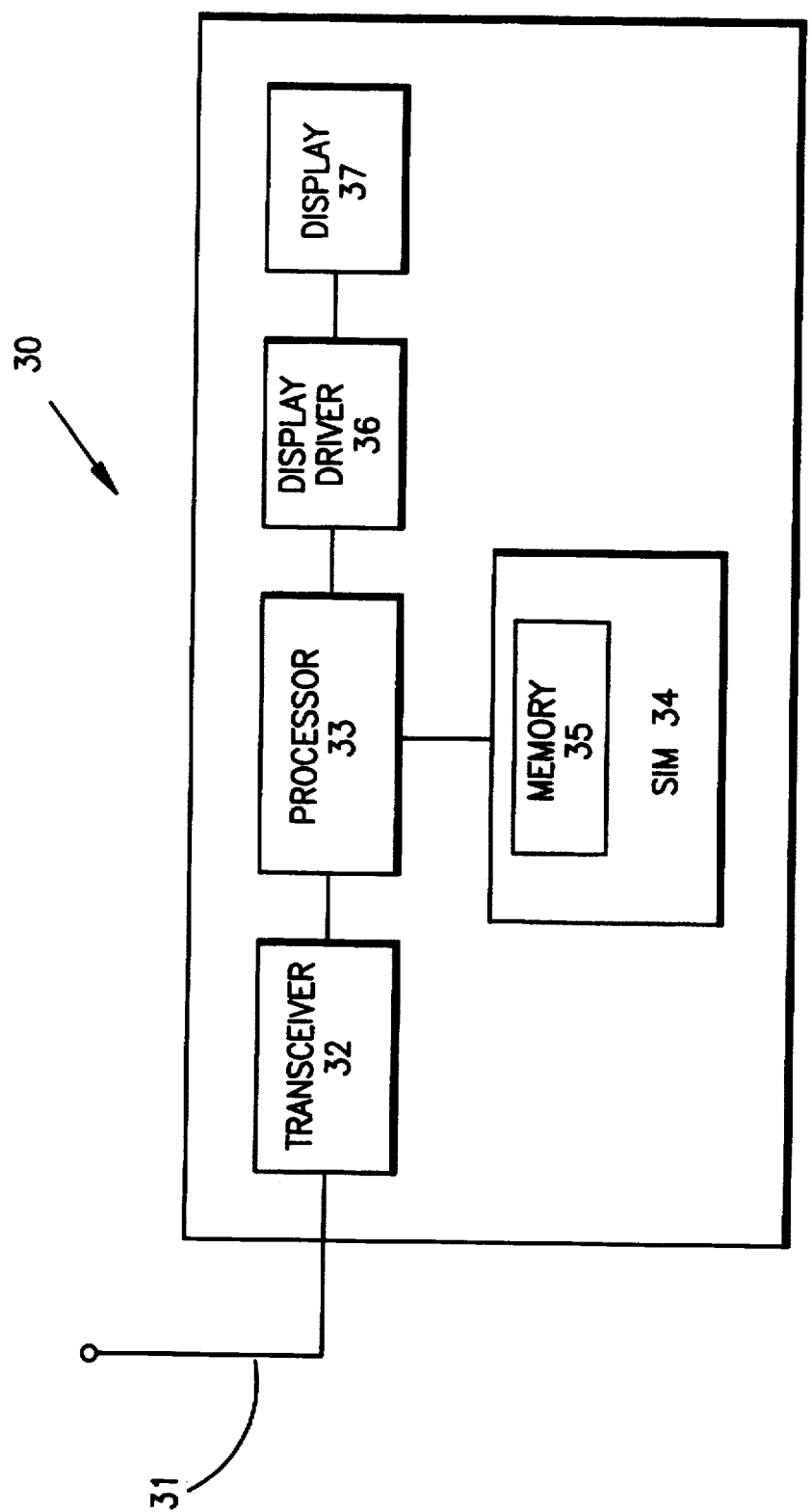
FIG. 2 shows a schematic block diagram of a mobile station according to the invention.

Once the service area cells that are overlapped by a subscriber's home and local calling areas are known, the respective identification codes of the service area cells area are transmitted to the subscriber's mobile station and stored in a memory at the mobile station. FIG. 2 shows a schematic block diagram of a mobile station 30 according to the invention. Mobile station 30 includes an antenna 31 coupled to a receiver 32. Signals output from receiver 32 are applied to subscriber terminal processor 33. A SIM 34 having a memory portion 35 and a display driver 36 are each coupled to processor 33. Display driver 36 is coupled to a display 37 that is preferably a liquid crystal display, but can be any suitable display for indicating to the subscriber whether the mobile station is located within differently defined calling zones.

As the mobile station 30 moves from service area cell to service area cell and registers with each new service area cell in a well-known manner, processor 33 compares the identification code of a newly entered service area cell with the identification codes stored in memory 35 for determining whether the physical location of the mobile station with respect to the defined calling areas. If processor 33 determines that mobile station 30 is within its home calling area based on a comparison of the identification code transmitted by the BTS of the service area cell in which the mobile station is located with the service area cells stored in SIM 34 of the mobile station defining the home calling area of mobile station 30, display 37 is actuated by display driver 36 for providing a visual indication that mobile station 30 is within its home calling area. If it is determined that the mobile station is located outside the home calling area, but within the local calling area based on a comparison of the service area cell identification code in which the mobile station is located with the identification codes of the local area service area cells stored in the memory of mobile station 30, display 37 is actuated for indicating that mobile station 30 is within its local calling area. Preferably, display 37 shows different icons at the same location on display 37 for representing different calling areas.

Figure 3:
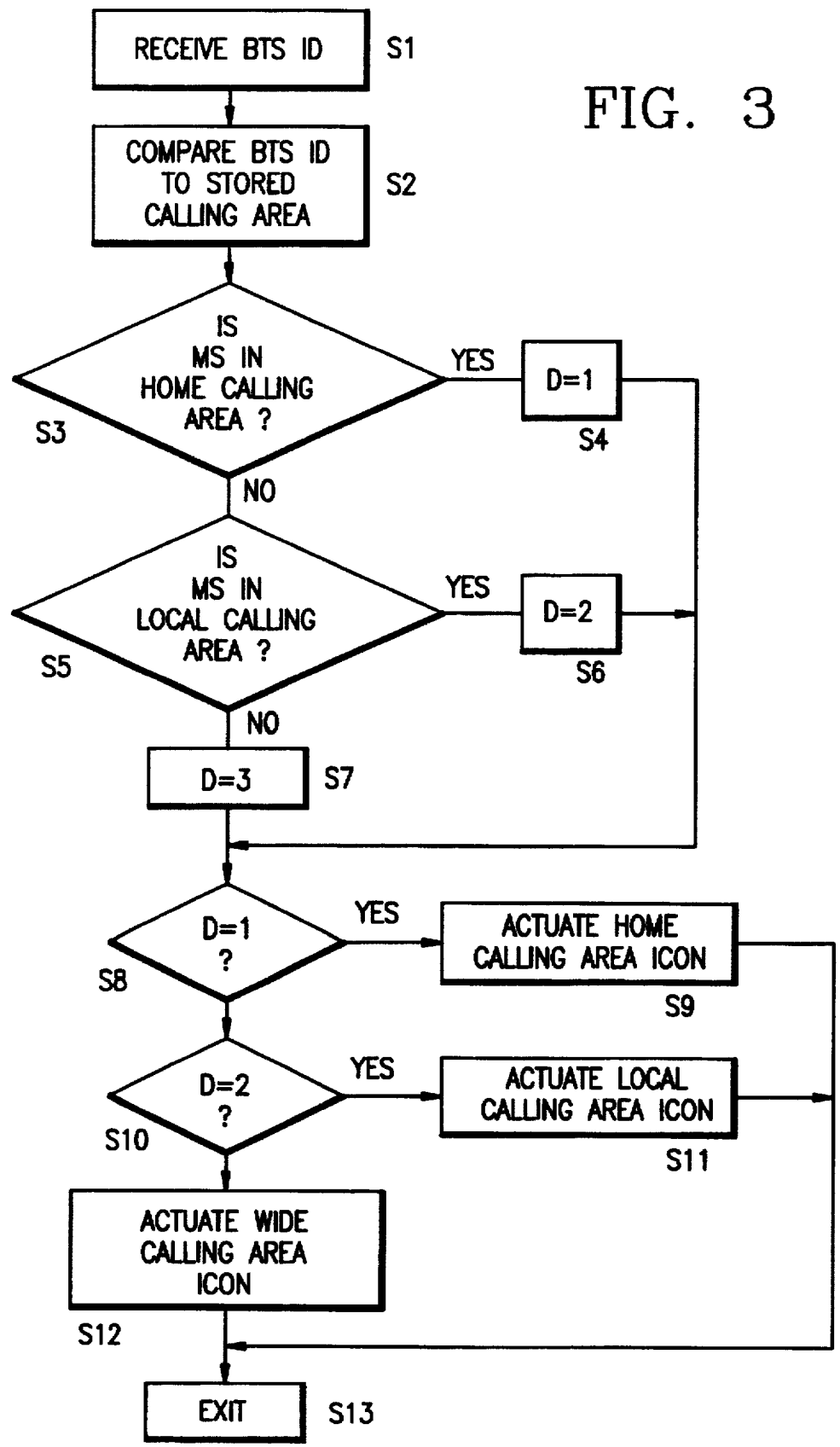
FIG. 3 shows a flow diagram for a process according to the present invention for determining whether a mobile station is within a particular calling area.

FIG. 3 shows a flow diagram for a process performed at the mobile station for determining whether a mobile station is within a particular calling area and for displaying an icon that is recognizable to a subscriber for the particular calling area. In step S1, the identification code of a BTS in which the mobile station is located is received during registration of the mobile station with the BTS in a well-known manner. In step S2, the received identification code is compared to the BTS identification codes stored in the mobile station SIM defining a home calling area. If the received identification code matches one of the BTS codes stored in memory at step S3, then at step S4 display variable D is set to a first predetermined value, for example, 1. If the received BTS code does not match the BTS codes representing the home calling area, the process moves to step S5 where it is determined whether the received BTS code matches any of the identification codes stored in the SIM of the mobile station defining the local calling area. If the received BTS identification code matches an identification code of the local calling area, then display variable D is set to a second predetermined value, for example, 2 at step S6. Display variable D is defined for a wider calling area by setting display variable D to a third predetermined value, for example, 3 at step S7. At step S8, it is determined whether display variable D equals 1. If so, the display is actuated for displaying a home calling area icon at step S9. If display variable D does not equal 1, it is determined whether D equals 2 at step S10. If so, the display is actuated for displaying a local calling area icon at step S11. If display variable D does not equal 1 or 2, then the display is actuated for displaying a wider area calling area icon at step S12. The process is exited at step S13.

A variation of this process would be to store a plurality of icons in registers of the memory of the mobile station for different levels of service for the same calling areas and associate a different value with each register. For example, voice mail alerting features can be provided with a basic level of mobile service. The process then sets a value of the display variable D as before, but uses the set value of the display variable D for accessing the appropriate register for displaying a calling area icon.

Figure 4A:
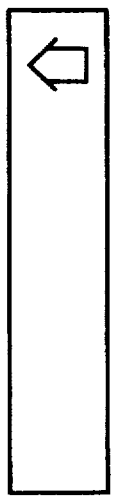
FIGS. 4(a)–4(c) show exemplary icons for different calling areas displayed by a mobile station of the present invention.
Figure 4B:
Figure 4C:

FIGS. 4(a)–4(b) show representative displays with exemplary icons for three different calling areas displayed at the same location on the display of a mobile station of the present invention. The exemplary icon of FIG. 4(a) represents a home calling area. The exemplary icon of FIG. 4(b) represents a local calling area and the exemplary icon of FIG. 4(c) is for a wider calling area. Other stylized icons, such as a trademark of the company providing the mobile telephone service for strengthening brand identification, for example, can be used for representing different calling areas.

According to a second embodiment of the present invention, the broadcast message of each BTS includes grid coordinate information such as identifier fields defining the geographical location of the BTS, for example, the latitude and longitude location of the BTS or coordinates of the BTS within a specified coordinate system associated with the service area of the mobile communication system. The coordinates of the geographical address of the mobile station are stored in the HLR and in the SIM of the mobile station.

Prior to a call set up, the mobile station receives and decodes the coordinate identifier fields transmitted by a BTS. The processor uses the decoded coordinate identifiers of the BTS and the coordinates of the geographical address of the mobile station to calculate a radius distance value from the geographical address to the BTS location using the Pythagorean theorem. The calculated radius distance is then compared to a home calling average radius stored in the mobile station SIM for determining the location of the mobile station with respect to the home calling area. The calculated radius distance is also used for determining the location of the mobile station with respect to the local calling area. Depending on the results of the determination, the display is actuated so that the appropriate icon is displayed for the subscriber.

In a third embodiment of the present invention, each BTS transmits grid coordinate information and is synchronized to a system reference clock located, for example, at MSC 22 in FIG. 1. The synchronization provides bit and frame alignment of the transmitted information from all BTSs. The mobile station scans multiple BTS transmitters in a well-known manner for reading the grid position information from each BTS. The mobile station determines differences in the time of arrival of the signals from each BTS monitored. The mobile station processor calculates position of the mobile station based on BTS grid location information stored in the SIM and the time of arrival of the respective BTS signals. The differences in the time of arrival from the BTS transmitters are converted into radial separation distances between each respective BTS and the mobile station. The position of the mobile station is then determined based on the radial separation distances. The determined position is then used for actuating the display with the appropriate calling area icon and is also transmitted to the MSC for system logging. The accuracy of the determined position improves as the number of BTS transmitter monitored increases.

While the present invention has been described in connection with the illustrated embodiments, it will be appreciated and understood that modifications may be made without departing from the true spirit and scope of the invention.

What is claimed is:

1. A method for providing different levels of mobile communication service for a mobile station within a communication system service area, the communication system including a common database having a memory, said common database having data related to grid coordinate data of a geographical location, and a plurality of base transceiver stations, each base transceiver station having a unique identification, being coupled to the common database providing a cellular service area for communicating with the mobile station, and being located with respect to other base transceiver stations for defining a plurality of overlapping cellular service areas, the plurality of cellular service areas defining the service area of the communication system, the method comprising the steps of:

associating a home geographical location with the mobile station, the home geographical location being located inside the service area of the communication system;

determining the identification of each base transceiver station having a cellular service area overlapping the home geographical location;

defining a home calling area for the mobile station to be the cellular service areas determined to overlap the home geographical location;

storing the identification of each base transceiver station having a cellular service area defining the home calling area in the memory of the common database;

determining a physical location of the mobile station with respect to the home calling area;

providing a first level of mobile communication service to the mobile station when the mobile station is determined to be inside the home calling area; and providing a second level of mobile communication service to the mobile station when the mobile station is determined to be outside of the home calling area.

2. The method according to claim 1, wherein the home calling area associated with the mobile station is a predetermined geometric shape having an average radius.

3. The method according to claim 2, wherein the average radius of the geometric shape is less than 2000 feet.

4. The method according to claim 3, wherein the step of determining the physical location of the mobile station with respect to the home calling area comprises the steps of:

synchronizing signals transmitted by a plurality of base transceiver stations;

monitoring the signals transmitted by the plurality of base transceiver stations at the mobile station;

detecting a time of arrival of the signals transmitted by respective base transceiver stations monitored by the mobile station;

calculating a radial separation distance from the mobile station to each of the respective base transceiver stations having signals monitored;

determining the physical location of the mobile station with respect to the home calling area based on the respective calculated radial separation distances;

transmitting the determined physical location of the mobile station to a base transceiver station; and transmitting the determined physical location from the base transceiver station receiving the determined physical location to the common database.

5. The method according to claim 3, wherein the step of determining the physical location of the mobile station with respect to the home calling area comprises the steps of:

storing grid coordinate data of the home geographical location of the mobile station in a memory of the mobile station;

storing grid coordinate data for each base transceiver station in the memory of the mobile station, the grid coordinate data for each base transceiver station including information of a geographical location of the base transceiver station associated with the data;

transmitting grid coordinate data from each base transceiver station, the grid coordinate data transmitted from each respective base transceiver station including information of the geographical location of the base transceiver station transmitting the grid coordinate data;

receiving the transmitted grid coordinate data at the mobile station from a base transceiver station;

determining the physical location of the mobile station based on the received grid coordinate data of the base transceiver station and the grid coordinate data stored in the memory of the mobile station;

transmitting the determined physical location of the mobile station to a base transceiver station; and transmitting the determined physical location from the base transceiver station receiving the determined physical location to the common database.

6. The method according to claim 3, wherein the mobile station includes a display for indicating a physical location of the mobile station with respect to the home calling area, the method further comprising the steps of:

storing the identification of each cellular service area defining the home calling area for the mobile station at the mobile station;

sending the identification of a cellular service area to the mobile station in which the mobile station is physically located;

comparing the identification of the cellular service area in which the mobile station is located to the identifications of the cellular service areas defining the home calling area; and actuating the display for indicating when the mobile station is located within one of the cellular service areas defining the home calling area.

7. The method according to claim 6, wherein the display is a liquid crystal display.

8. The method according to claim 7, wherein the step of actuating the display includes the step of displaying an icon indicating the home calling area.

9. The method according to claim 6, wherein the communication system further includes a billing computer coupled to the memory of the common database, the method further comprising the steps of:

calculating a first cost of service at the billing computer when the first level of mobile service is provided to the mobile station; and calculating a second cost of service at the billing computer when the second level of mobile service is provided to the mobile station.

10. The method according to claim 9, further comprising the steps of:

associating the cellular service areas of additional base transceiver stations with the geographical location of the mobile station, geometric shapes of the additional cellular service areas defining a geographical region beyond the home calling area;

determining the identification of each of the additional base transceiver stations;

defining a local calling area for the mobile station to be the additional cellular service areas;

storing the identification of each additional cellular service area defining the local calling area at the common database;

providing a second level of mobile communication service when the mobile station is determined to be outside the home calling area and inside the local calling area; and providing a third level of mobile communication service when the mobile station is determined to be outside of the local calling area.

11. The method according to claim 10, wherein one or more of the additional cellular service areas overlaps the home calling area.

12. The method according to claim 10, wherein at least a portion of each of the additional cellular service areas is within a predetermined geographic boundary.

13. The method according to claim 10, further comprising the step of calculating a third cost of service at the billing computer when the third level of mobile service is provided to the mobile station.

14. The method according to claim 10, wherein the display is a liquid crystal display and the step of actuating the display includes the steps of;

displaying a home calling area icon when the mobile station is determined to be within the home calling area; and displaying a local calling icon when the mobile station is determined to be within the local calling area.

15. The method according to claim 14, wherein the home calling area icon and the local calling area icon are displayed at a same location on the display.

16. A communication system for providing different levels of mobile communication service for a mobile station within a communication system service area, the communication system comprising:

a plurality of base transceiver stations, each base transceiver station having a unique identification, having a cellular service area for communicating with the mobile station, and being located with respect to other base transceiver stations for defining a plurality of overlapping cellular service areas, the plurality of cellular service areas defining the service area of the communication system; and a common database coupled to each base transceiver station, the common database having a memory storing data related to the mobile station including data related to the grid coordinate data of a geographical location, the data related to the mobile station including data related to a home geographical location located inside the communication system service area associated with the mobile station, a geographical region surrounding the home geographical location of the mobile station, a home calling area for the mobile station defined by the identification of each base transceiver station having a cellular service area overlapped by the geographical region surrounding the home geographical location of the mobile station, and a physical location of the mobile station with respect to the home calling area, the common data base providing a first level of mobile communication service to the mobile station when the physical location of the mobile station is inside the home calling area, and providing a second level of mobile communication service to the mobile station when the physical location of the mobile station is outside of the home calling area.

17. The system according to claim 16, wherein the home calling area of the mobile station is a predetermined geometric shape having an average radius.

18. The system according to claim 17, wherein the average radius of the geometric shape is less than 2000 feet.

19. The system according to claim 18, wherein the mobile station comprises:

a transceiver;

a processor coupled to the transceiver; and a memory coupled to the processor, wherein the plurality of base transceiver stations transmit synchronized signals, the processor of the mobile station monitors the synchronized signals transmitted by the plurality of base transceiver stations, detects a time of arrival of the signals transmitted by respective base transceiver stations monitored by the mobile station, and determines the physical location of the mobile station with respect to the home calling area, and the transceiver of the mobile station transmits the determined physical location to a base transceiver station for storage in the memory of the common database.

20. The system according to claim 19, wherein the processor of the mobile station calculates a radial separation distance from the mobile station to each of the respective base transceiver stations having signals monitored by the mobile station, and determines the physical location of the mobile station with respect to the home calling area based on the respective calculated radial separation distances.

21. The system according to claim 18, wherein the data stored in the memory of the common database includes data related to grid coordinate data of a geographical location for each respective base transceiver station, wherein each base transceiver station transmits grid coordinate data of the geographical location of the respective base transceiver station transmitting the grid coordinate data, wherein the mobile station comprises:

a transceiver;

a processor coupled to the transceiver; and a memory coupled to the processor, the memory of the mobile station storing grid coordinate data of the geographical location for the mobile station and the grid coordinate data for each base transceiver station, and wherein, the transceiver receives the transmitted grid coordinate data from a base transceiver station, the processor determines the physical location of the mobile station based on the received grid coordinate data of the base transceiver station and the grid coordinate data stored in the memory of the mobile station, and the transceiver transmits the determined physical location to a base transceiver station for storage in the memory of the common database.

22. The system according to claim 21, wherein the display is a liquid crystal display.

23. The system according to claim 22, wherein the display displays an icon indicating the home calling area when the mobile station is physically located within the one of the cellular service areas defining the home calling area.

24. The system according to claim 18, wherein the mobile station comprises:

a transceiver, the transceiver receiving the identification of a base transceiver station from the base transceiver station of the cellular service area in which the mobile station is physically located;

a processor coupled to the transceiver;

a memory coupled to the processor, the memory of the mobile station storing the identification of each base transceiver station having a cellular service area defining the home calling area for the mobile station; and a display coupled to the processor, wherein the processor compares the received identification of the base transceiver station of the cellular service area in which the mobile station is located to the identification of each cellular service area defining the home calling area stored in the memory of the mobile station and actuates the display indicating when the mobile station is physically located within one of the cellular service areas defining the home calling area.

25. The system according to claim 22, wherein the communication system further comprises a billing computer coupled to the memory of the common database, the billing computer calculating a first cost of service for the mobile station when the first level of mobile service is provided to the mobile station, and calculating a second cost of service for the mobile station when the second level of mobile service is provided to the mobile station.

26. The system according to claim 25, wherein the data relating to the mobile station stored in the memory of the common database includes data related to cellular service areas of additional base transceiver stations associated with the home geographical location of the mobile station, the cellular service areas of the additional base transceiver stations defining a geographical region surrounding the home geographical location of the mobile station, and a local calling area for the mobile station defined by the identification of the additional base transceiver stations having the cellular service areas defining the geographical region surrounding the home geographical location of the mobile station; and wherein the common database provides a second level of mobile communication service when the physical location of the mobile station is outside the home calling area and inside the local calling area, and provides a third level of mobile communication service when the physical location mobile station is outside of the local calling area.

27. The system according to claim 26, wherein one or more of the cellular service areas of the additional base transceiver stations overlap the home calling area.

28. The system according to claim 27, wherein at least a portion of the cellular service areas of the additional base transceiver stations is within a predetermined geographic boundary.

29. The system according to claim 26, wherein the billing computer calculates a third cost of service for the mobile station when the third level of mobile service is provided to the mobile station.

30. The system according to claim 26, wherein the display is a liquid crystal display, and the display displays a home calling area icon when the mobile station is physically located within one of the cellular service areas defining the home calling area and displays a local calling area icon when the mobile station is physically located within one of the cellular service areas defining the local calling area.

31. The system according to claim 30, wherein the home calling area icon and the local calling area icon are displayed at the same location on the display.

32. A mobile station in a mobile communication system, the communication system including a plurality of base transceiver stations, each base transceiver station having a cellular service area for communicating with the mobile station, having a unique identification code that is transmitted by the base transceiver station, and being located with respect to other base transceiver stations for defining a plurality of overlapping cellular service areas, the plurality of cellular service areas defining the service area of the communication system, and a common database coupled to each base transceiver station, said common database having data related to the grid coordinate data of a geographical location, the mobile station comprising:

a transceiver, the transceiver receiving an identification code transmitted by a base transceiver station;

a processor coupled to the transceiver;

a memory coupled to the processor, the memory storing home calling area information associated with the mobile station, the home calling area information including at least one identification code of a base transceiver station; and a display, the processor determining a physical location of the mobile station based on the received identification code and the home calling area information stored in the memory, the processor actuating the display for indicating when the physical location of the mobile station is determined to be in the home calling area, and the transceiver transmitting the determined physical location to a base transceiver station for transmission to the common database.

33. The mobile station according to claim 32, wherein the display is a liquid crystal display.

34. The mobile station according to claim 33, wherein the display displays an icon representing the home calling area when the display is actuated by the processor.

35. The mobile station according to claim 34, wherein each base transceiver station further transmits grid coordinate data of a geographical location of the respective base transceiver station transmitting the grid coordinate data, and the home calling area information stored in the memory includes grid coordinate data of at least one base transceiver station.

36. The mobile station according to claim 34, wherein the plurality of base transceiver stations transmit synchronized signals, and the processor of the mobile station monitors the synchronized signals transmitted by the plurality of base transceiver stations, detects a time of arrival of the signals transmitted by respective base transceiver stations monitored by the mobile station, and determines the physical location of the mobile station with respect to the home calling area.

37. The mobile station according to claim 34, wherein the processor compares the received identification code transmitted by the base transceiver station to the identification code of the at least one base transceiver station associated with the mobile station stored in the memory of the mobile station.

38. The mobile station according to claim 32, wherein the memory stores local calling area information associated with the mobile station, the local calling area information including at least one identification code of a base transceiver station other than the at least one base transceiver station included in the home calling area, and the display is a liquid crystal display; and wherein the displays a home calling area icon when the mobile station is within the home calling area and a local calling area icon when the mobile station is within the local calling area.

39. The mobile station according to claim 38, wherein the home calling area icon and the local calling area icon are displayed at the same location on the display.

40. A mobile station in a mobile communication system the communication system including a plurality of base transceiver stations, each base transceiver station having a cellular service area for communicating with the mobile station, having a unique identification code that is transmitted by the transceiver station, and being located with respect to other base transceiver stations for defining a plurality of overlapping cellular service areas, the plurality of cellular service areas defining the service area of the communication system, and a common database coupled to each base transceiver station, said common database having data related to the arid coordinate data of a geographical location, the mobile station comprising:

- a transceiver, the transceiver receiving an identification code transmitted by a base transceiver station;
- a processor coupled to the transceiver;
- a memory coupled to the processor, the memory storing home calling area and local calling area information associated with the mobile station, the home calling area information including at least one identification code of a base transceiver station and the local calling area information including at least one identification code of a base transceiver station other than the at least one base transceiver station of the home calling area; and
- a liquid crystal display,
- the processor determining a physical location of the mobile station based on the received identification code and the home calling area information stored in the memory, the processor actuating the display for displaying a home calling area icon when the physical location of the mobile station is determined to be in the home calling area and for displaying a local calling area icon when the mobile station is determined to be in the local calling area.

41. The mobile station according to claim 40, wherein the home calling area icon and the local calling icon are displayed at the same location on the display.

* * * * *